United States Patent [19]

Niinomi et al.

[11] 4,242,188

[45] Dec. 30, 1980

[54] METHOD FOR CONTROLLING PLASMA CHEMICAL REACTIONS

[75] Inventors: Masahiro Niinomi, Yokohama; Kenji Yanagihara, Atsugi, both of Japan

[73] Assignee: Japan Synthetic Rubber Co., Ltd., Tokyo, Japan

[21] Appl. No.: 22,193

[22] Filed: Mar. 20, 1979

[30] Foreign Application Priority Data

Mar. 23, 1978 [JP] Japan ................................. 53/33226

[51] Int. Cl.³ .......................... C22D 7/08; C05D 7/00; B01J 1/12; B05D 1/00
[52] U.S. Cl. ..................................... 204/164; 118/724; 204/165; 250/546; 422/111; 422/138; 422/186; 423/659; 427/34
[58] Field of Search ................ 204/164, 165, 168, 169; 422/111, 138, 186; 118/724; 423/659; 250/546

[56] References Cited

U.S. PATENT DOCUMENTS

| | | | |
|---|---|---|---|
| 2,701,210 | 2/1955 | Fisher et al. | 106/189 |
| 3,306,711 | 2/1967 | Angerhofer | 422/111 |
| 3,728,085 | 4/1973 | Horiguchi et al. | 422/109 |
| 3,963,443 | 6/1976 | Bond et al. | 423/659 X |

OTHER PUBLICATIONS

Langmuir, Gen. Elec. Rev. vol. XXVI, No. 11, pp. 731–735 (1923).
Klagge, Beitraege Plasmaphysik, vol. 15, pp. 309–317 (1975).

Primary Examiner—F. C. Edmundson
Attorney, Agent, or Firm—Oblon, Fisher, Spivak, McClelland & Maier

[57] ABSTRACT

In a plasma chemical reaction carried out with at least one gas, the plasma constants in the progress of reaction such as electron temperature, electron density and electron energy distribution function can be measured by use of a probe heated to a high temperature which is made of a metal having a small thermionic electron emission at a high temperature. The plasma chemical reaction can be performed in the steady state with satisfactory reproduction of composition, structure, yield and performance of the product by controlling the pressure, input power and gas flow rate in the plasma reactor so that the measured plasma constants always coincide with the predetermined plasma constants necessary for effecting the intended chemical reaction which have been obtained through a preliminary experiment.

14 Claims, 13 Drawing Figures

METHOD FOR CONTROLLING PLASMA CHEMICAL REACTIONS

This invention relates to a method for carrying out a plasma chemical reaction (hereinafter referred to as plasma reaction). More particularly, this invention relates to a method for monitoring and thereby controlling plasma reactions such as plasma polymerization reaction by use of probes for measuring physical quantities necessary to the control of plasma reaction such as electron temperature ($T_e$), electron density ($n_e$), electron energy distribution function ($f(\epsilon)$) and the like (hereinafter referred to as plasma constants).

Plasma polymerization process has hitherto been known as a process for effectively forming a thin film rich in functionality on a solid surface. However, this process is disadvantageous in that the film produced by this process lacks reproducibility of structure and performances. The poor reproducibility is attributable to the fact that composition, structure, yield and performance of the film greatly vary with slight variation of plasma reaction conditions such as input power, pressure, gas flow rate, etc. in the plasma reactor or with existence of a slight quantity of impurities in the plasma reactor. It may be one of the methods for improving the reproducibility to measure individual factors with high accuracy by use of various means for detecting the variation of reaction conditions, such as power meter, manometer, rotameter for gas and the like. However, this method is disadvantageous in that changes of partial pressures of reactants at different places in the plasma reactor, the most important factor to control the reaction, cannot be detected, and the occurrence of abnormal reaction resulting from the variation of partial pressure can neither be detected. In other words, the most important reason for the low reproducibility of plasma reactions, such as plasma polymerization, is that no good means for rapidly detecting abnormalities in progress of reaction is available.

Accordingly, if the variations in reaction conditions or the like mentioned above are prevented on the one hand and, if an abnormality is detected with a high sensitivity as soon as it arises and the operation factors are rapidly controlled to recover the normal plasma constants on the other hand, it will be possible to enhance the reproducibility of plasma reaction which will enable, for example, the production of plasma polymerization film with high reproducibility.

It is known that the plasma constants of the statistic ensemble of electrons in an equilibrium state can be checked by measuring $T_e$ and $n_e$ by use of a probe (for example, for single probe method, I. Langmuir, Gen. Elec. Rev. 26, 731 (1923), and for double probe method, Toshihiko Dote, Rikagaku Kenkyujo Hokoku, 44 [3], 119 (1968)). However, the statistic ensemble of electrons is not in a thermal equilibrium in such a plasma reaction system that polymerization reaction proceeds, so that the conception of electron temperature is obscure and no study has hitherto been conducted concerning the use of $T_e$ or $n_e$ as an index for plasma reaction.

When $T_e$, $n_e$ and $f(\epsilon)$ of plasma are measured by means of a conventional probe in such a reaction as to form a film on a solid surface such as plasma polymerization reaction, a plasma reaction product such as polymerization product, deposits also onto the surface of the probe and hence, it is impossible to measure the values. With the aim of overcoming this difficulty, a variety of attempts have been made to measure plasma constants while heating the probe to prevent the deposition of the product thereon. For example, according to the method using single probe method mentioned in S. Klagge, Beitraege Plasmaphysik, 15, 309 (1975) and G. Wehner and G. Medicus, J. Appl. Phys. 23, 1035 (1952), the temperature of a very fine probe is elevated with the energy of plasma itself to prevent the deposition of polymerization product on the probe in the course of measurement. However, if this method is applied to systems of high polymerization rate, the representatives of which are ethylene polymerization system, acetylene polymerization system, benzene polymerization system, and the like, it is impossible to keep the probe at a high temperature enough to prevent the deposition of polymer for a long period of time extending from the start of polymerization to its end. Thus, this method is applicable only to systems of low polymerization rate.

In another method using double probe method [A. I. Shustov, B. V. Tkachyk, Chemistry of High Energy, Vol. 8, No. 3, p. 242 (1974)], it is proposed to keep the probe at a high temperature by heating the whole of the insulating support for the probe by means of a heater. By this method, however, the temperature of probe can reach at most 600°–700° K., so that it cannot be applied at all to said plasma polymerization reactions of high reaction rate such as the plasma polymerization of acetylene, ethylene, benzene or the like.

Another method is an emitting probe method often applied to the measurement of plasma potential by utilization of the emission of thermionic electrons, according to which the probe itself is employed as a heater or a heater is inserted into the probe circuit to heat the probe by heat conduction through the metallic wire (W. H. Ernst, Helv. Phys. Acta, 8, 381 (1935)). In this case, electric current for the heater flows through the probe itself to increase noises in measurement. Since the electron density is generally small (sometimes less than $10^8$ electrons/cm$^3$) in the case of reactive plasma, particularly polymerization plasma, this method gives so small a signal/noise ratio S/N that this method cannot be employed practically. The S. Klagge method, the A. I. Shustov method and the W. H. Ernst method are only for trying to measure plasma constants but not for using the measured plasma constants as index for controlling the plasma reaction.

The present inventors have conducted extensive studies with the aim of solving the above-mentioned problems. As the result, it has been found that a probe can easily be heated to a high temperature and maintained at a constant temperature when the probe is made of a metal of a small thermionic electron emission at a high temperature (that is, having a great work function) and has inserted thereinto a heater covered with a heat-resistant, electrically insulating material, whereby the deposition of plasma reaction product and the like onto the probe can be prevented and $T_e$, $n_e$ and $f(\epsilon)$ can also be measured in the reaction over a long period of time. Further it has been found that a probe made of the said metal can be maintained at any desired high temperature for any desired period of time without being accompanied by any electric noise by heating the probe with condensed infrared rays. In the latter case, infrared rays having a wave length shorter than $10^5$ Å are particularly effective for heating the probe to a high temperature.

The use of such a probe makes it possible to measure continuously and exactly plasma constants, i.e., $T_e$, $n_e$ and $f(\epsilon)$, in the course of plasma reaction. It has also been found that if the reaction is allowed to proceed while controlling the pressure, input power and gas flow rate in the plasma reactor so as to keep the plasma constants unchanged throughout the plasma reaction, there is obtained a reaction product with a very excellent reproducibility in respect of composition, structure, yield and performance.

According to this invention, there is provided a method for carrying out a plasma reaction by use of one or more gases in a plasma reactor, which comprises measuring plasma constants in the progress of reaction by means of at least one probe for the measurement of plasma constants heated to a predetermined temperature and regulating the pressure, input power and gas flow rate in the plasma reactor to allow the measured plasma constants to coincide always with the previously obtained values of plasma constants necessary for effecting the intended chemical reaction. Said probe may consist of a probe made of a metal of a small thermionic electron emission at a high temperature and a heating means for forcibly giving said probe an energy from an energy source other than the plasma in non-electrical contact with the probe in order to heat said probe.

Said probe is made of any metal of a small thermionic electron emission at a high temperature (that is, having a great work function). Preferably, said metal is selected from those having a thermionic electron emission of $5 \times 10^{-6}$ A/cm$^2$ or less as calculated according to the generally known equation of Richardson. Examples of the metal include Ni, Fe, Cr, W, Re, Rh, Ir, Pt and the like, among which Ir is particularly preferable when the probe is used at a temperature of 1,500° K. or above. Said small thermionic electron emission metals are not limited to pure metals and alloys consisting of such metals may also be used.

Shape and dimension of probe are preferably desiged so that they cause no change in the state of plasma present in the plasma reactor and $T_e$, $n_e$ and $f(\epsilon)$ can be calculated from the voltage (V)-current (I) characteristic curve. Concretely speaking, it is preferable that the probe has a simple shape such as cylinder, plate or sphere because they are easy to produce. In the case of cylinder or sphere, the radius is preferably about 500 $\mu$m or less. In the case of plate, the thickness is preferably about 500 $\mu$m or less. It is needless to say that probes having a dimension greater than above can also be applied for some objects as the probe in the method of this invention, though the accuracy of measurement may be lower.

An electric heater may be used as a means for heating the probe. Said heater is covered with an insulating material such as aluminum oxide, ruthenium oxide, high melting glass or the like and then inserted into the probe. In an example of probe, a tungsten heater having an alumina sheath having a radius of 200 $\mu$m is inserted into a probe having a radius of 500 $\mu$m and a length of 1.5 cm.

An appropriate dimension of the heater may be selected in consideration of heater resistance, heater voltage and intended temperature of probe. In the case of the above-mentioned example of probe, the probe temperature can be elevated to 1,300° K. in an Ar atmosphere of 0.5 Torr by employing a heater voltage of 9 V and a heater resistance of 7 $\Omega$. The probe temperature can be elevated to 1,800° K. by further enhancing the heater voltage. Though the heater current source may be an alternating current source, a direct current source is preferably employed in order to minimize the noise in measurement due to induction current.

It is also possible to heat the probe with an infrared lamp placed outside or inside the reactor. In an example, a commercially available condensation heating type of infrared heater (wave length: $10^5$ Å–$2 \times 10^3$ Å) is placed outside a quartz glass reactor at a distance of 5 cm from the reactor wall and a Ni-made probe is heated under the conditions of 100 V and 650 W. The probe used is a flat square plate of nickel having a thickness of 50 $\mu$m and a side length of 5 mm. By this technique, the surface temperature of probe can be elevated to about 1,300° K., where $T_e$, $n_e$ and $f(\epsilon)$ can be measured without any deposition of polymer film on the probe surface even when a plasma polymerization of benzene or ethylene is performed for a long period of time. The surface temperature of probe can be elevated to 1,800° K. by increasing the electric power of infrared heater.

If the temperature of probe is elevated to preferably about 1,000° K. or more, more preferably 1,300° K. or more by the process of this invention, $T_e$, $n_e$ and $f(\epsilon)$ of usual plasma reaction systems can be measured. If the temperature of probe is elevated to about 1,800° K. or more, the deposition of polymer on the probe surface can be prevented even in special systems of a very high reaction rate such as systems containing a halogen compound typified by the reaction system of ethylene mixed with chlorine gas or systems containing acetylene, so that the intended plasma reaction, for example, polymer film formation, can be performed with a satisfactory reproducbility by measuring $T_e$, $n_e$ and $f(\epsilon)$ during the reaction and controlling them so as to fit the predetermined standard conditions for the plasma reaction.

When $T_e$, $n_e$ and $f(\epsilon)$ deviate from the standard values, they are returned to the standard values by regulating the pressure, input power and gas flow rate in the reactor. Specifically, the pressure can be regulated by means of the exhaust gas regulating valve, the gas flow rate can be regulated by means of the respective flow rate regulating valves for the gases used, and the input power can be regulated by means of a power regulator. In this invention, each of the $T_e$, $n_e$ and $f(\epsilon)$ is a function of pressure, gas flow rate and input power, and it depends on the contents of reaction which valve or regulator should be operated in order to correct the deviation in $T_e$, $n_e$ or $f(\epsilon)$.

The procedure in a typical reaction will be illustrated below.

(1) The case where the $f(\epsilon)$ in a plasma reaction is in the Maxwell distribution or close thereto.

$T_e$ and $n_e$ have physical meanings, so that no measurement of $f(\epsilon)$ is necessary. Such a case corresponds to the case where the partial pressures of reactants are low, specifically the case of ashing by means of oxygen plasma and the case of surface activation or crosslinking by means of rare gas plasma.

In this case, the control can be practised by operating only the exhaust gas regulating valve and power regulator, because a slight change in the gas flow rate does not affect the reaction appreciably. Although a rough control can be practised by correcting the deviation of $T_e$ by means of the power regulator and correcting the deviation of $n_e$ by means of the exhaust gas regulating valve, a more accurate control necessitates to correct $T_e$ or $n_e$ by alternately operating the exhaust gas regulating valve and the power regulator.

(2) The case where f(ε) deviates greatly from the Maxwell distribution.

This case corresponds to plasma polymerization reactions and etching with a plasma containing olefinic gas or halogen gas.

This includes the case where plasma reactions are controllable only with $T_e$ and $n_e$ and the case where control with f(ε) is more convenient.

The physical significance of $T_e$ and $n_e$ are obscure in this case, but many of the plasma reactions belonging to this case can be controlled with $T_e$ and $n_e$ satisfactorily. Examples of this case include plasma polymerization reactions of argon-benzene plasma, argon-allylamine plasma, argon-pyridine plasma, argon-nitrobenzene plasma, argon-acetylene plasma, argon-ethylene plasma, argon-allene plasma, argon-tetrafluoroethylene plasma, argon-ethyleneoxide plasma, argon-hexamethyldisiloxane plasma, argon-tetramethyldisiloxane plasma, argon-dvinyltetramethyldisiloxane plasma and the like, as well as plasma polymerization of the above plasmas in which the argon is replaced by He or Ne.

Since the gas flow rate has a very important effect on this type of plasma reactions, the gas inlet valve should also be controlled. In order to correct the deviation of $T_e$, it is preferable to carry out the regulation many times in the order of (1) the power regulator, (2) the gas flow rate regulating valve and (3) the exhaust gas regulating valve. In order to correct the deviation of $n_e$, it is preferable to carry out the regulating as often as necessary in the order of (A) the gas flow rate regulating valve, (B) the exhaust gas regulating valve and (C) the power regulator. In most cases, $T_e$ can be corrected only with (1) and $n_e$ can be regulated only with (A) and (B).

Some plasma reactions of this case cannot be controlled with $T_e$ or $n_e$ and can be controlled with f(ε) more conveniently. In the case of such reactions, it is necessary to monitor the form of f(ε) and to operate the gas flow rate regulating valve, the exhaust gas regulating valve and the power regulator alternately so that the found f(ε) coincides with the predetermined standard of f(ε).

When the value of f(ε) at a certain level of energy has a particularly important effect on the reaction, however, the control may be practised by regarding said value of f(ε) as a plasma constant.

Currently, low temperature plasmas are actively utilized, for example, for removing a photoresist or other organic compounds by contacting them with an oxygen-containing gas plasma or for leaving the inorganic compounds present in a sample. Also, gas plasma etching is carried out in semiconductor industry for the purpose of selectively removing Si and Si compounds by the aid of the plasma of a gas containing Freon gas or the like. Both of the techniques aim at selectively removing particular components from a sample by the aid of a gas plasma having a specific composition.

In these techniques, the difficulty is that the speed of removing a substance is low. Enhancing the plasma energy for elevating the speed of removal of a substance, however, results in removing even the substance to be left and in lowering the dimensional accuracy of etching. Therefore, the enhancement of the plasma energy is disadvantageous. For this reason, it has hitherto been conventional to conduct the operation under optimum conditions which enable a selective removal as quickly as possible. Even when the gas flow rate, pressure and input power in the plasma reactor vary whereby the reaction conditions deviate from the optimum conditions, however, no means has hiterto been available for detecting it and hence the reaction has been continued as it has been. Consequently, unevenness in structure and performance of product has been experienced frequently. Furthermore, in the progress of reaction, there takes place a change of sample surface area or a change of plasma state due to the emission of a gas from the sample or base plate, and ultimately the reaction conditions deviate frequently from the optimum conditions. Nevertheless, in the conventional probe measurement, it has been impossible to measure $T_e$, $n_e$ and f(ε) accurately due to the deposition of material to be removed on the surface of probe, and there has been known no effective means for coping with this problem.

According to this invention, the reaction conditions can be controlled and optimized by accurately measuring these plasma constants over a long period of time so that the selective removal of material can be practised effectively with a high speed and a high reproducibility.

This invention will be illustrated below referring to the accompanying drawings, in which

FIG. 2 is a conceptional diagram of the electrode-containing plasma reactor in which the probe of this invention is built-in;

Figure 1:
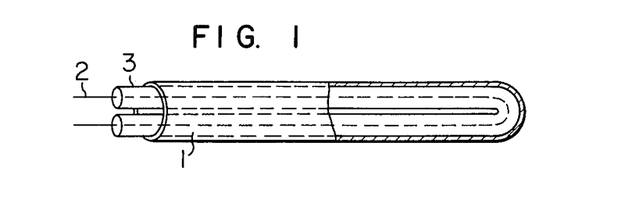
FIG. 1 is an example of the probe of this invention for measuring plasma constants.
Figure 2:
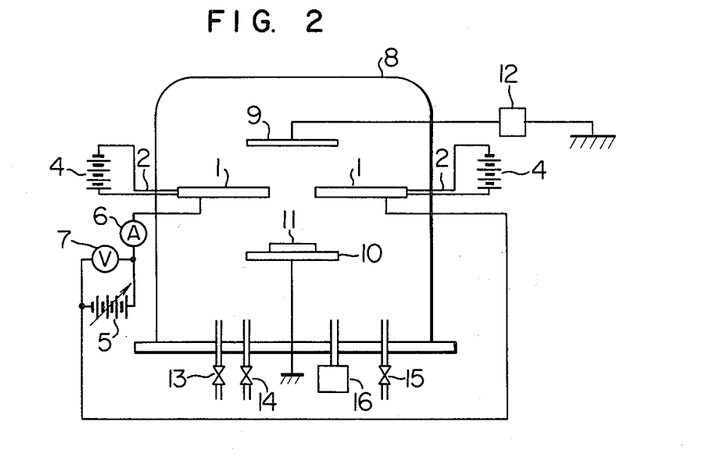

In FIG. 1, 1 is the main body of the probe and 2 is a tungsten heater inserted into the main body of the probe which is covered with a heat-resistant insulating material 3, such as aluminum oxide. FIG. 2 illustrates an electrode-containing plasma reactor in which the probe of this invention is built-in, wherein 1 is a probe; 2 is a heater; 4 is a power supply for heater; 5 is a power supply for measuring plasma constants; 6 is an ammeter; 7 is a voltmeter which forms, in conjunction with the power supply 5 and the ammeter 6, a circuit for detecting the charge flowing into the probe 1 to be contacted with plasma; 8 is a plasma reactor; 9 is an upper electrode; 10 is a lower electrode; 11 is a sample; 12 is a radio frequency power supply; 13 is a monomer inlet; 14 is a carrier gas inlet; 15 is an outlet; and 16 is a manometer.

Figure 3:
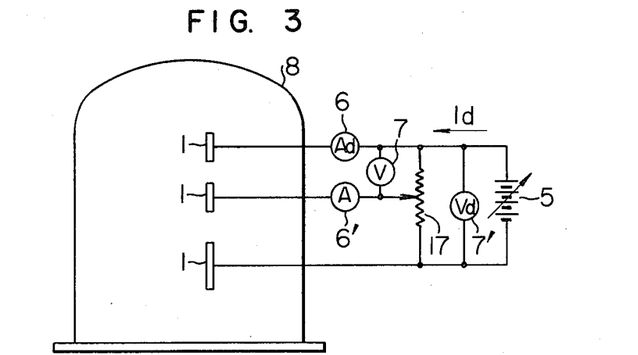
FIG. 3 is a conceptional diagram of the triple probe method for measuring electron energy distribution function f(ε)
Figure 4A:
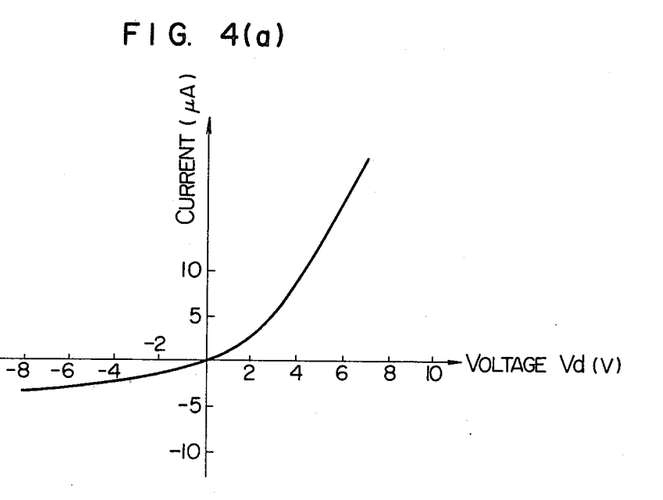
FIGS. 4(a) and 4(b) are examples of the measurement of V-I characteristic curve and f(ε) by the triple probe method.
Figure 4B:
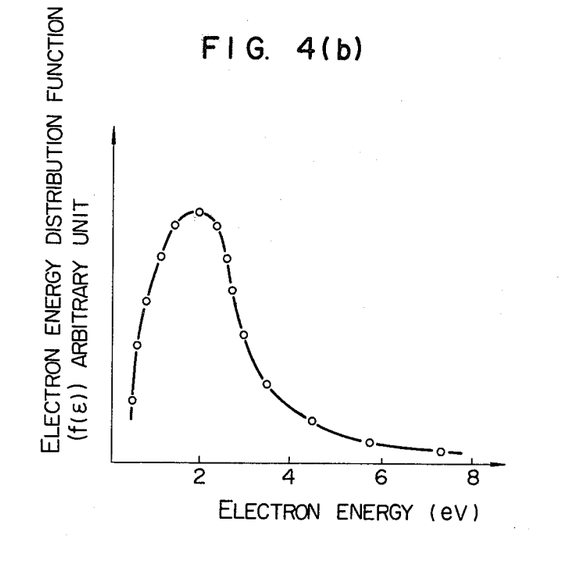
Figure 5:
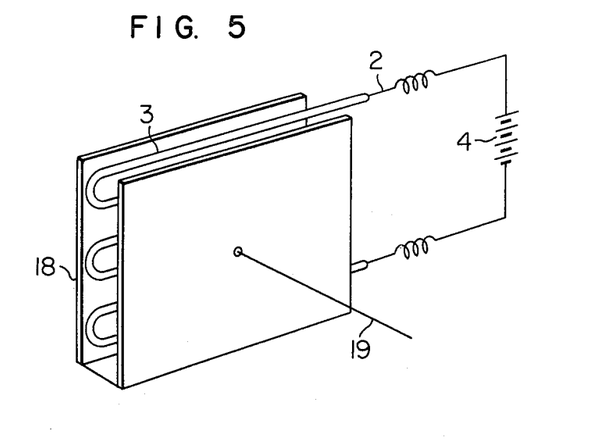
FIG. 5 is a conceptional diagram of the plate probe.

FIG. 3 shows an electric circuit for measuring $f(\epsilon)$ by the triple probe method for using plasma reaction by high frequency discharge, laser discharge, or the like. The $f(\epsilon)$ of direct current discharge plasma reaction can be measured by the single probe method. The V-I characteristics are measured while regulating the resistance 17 so that the ammeter 6' gives an indication of 0, from which the $f(\epsilon)$ is calculated according to the known method (Takayoshi Okuda and Kenzo Yamamoto, J. Appl. Phys., 31, 158 (1960). FIG. 4(a) illustrates an example of the V-I characteristic curve of argon-benzene plasma measured by a triple probe method. FIG. 4(b) illustrates an example of the $f(\epsilon)$ calculated from the characteristic curve of FIG. 4(a) according to the aforementioned method. FIG. 5 is a conceptional diagram of a plate probe, wherein 2 is a tungsten heater, 4 is a power supply for the heater, 3 is an aluminum oxide sheath for the heater, 18 is a nickel plate electrode, and 19 is a lead wire for probe.

This invention will be illustrated below referring to Examples, which are by way of illustration and not by way of limitation.

EXAMPLE 1

Figure 6A:
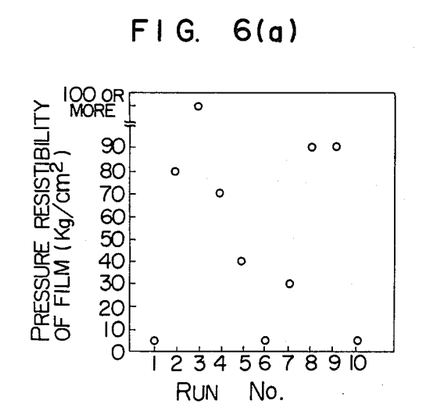
FIG. 6(a) is a diagram indicating the pressure resistibility of plasma-polymerized styrene membrane prepared under the fixed preparation conditions.
Figure 6B:
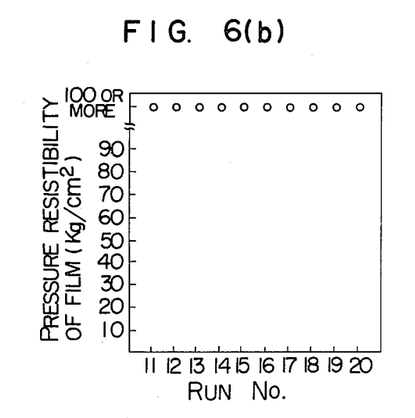
FIG. 6(b) is a diagram indicating the pressure resistibility of a membrane which has been prepared under the controlled conditions while measuring the electron temperature ($T_e$) and electron density ($n_e$)
Figure 7A:
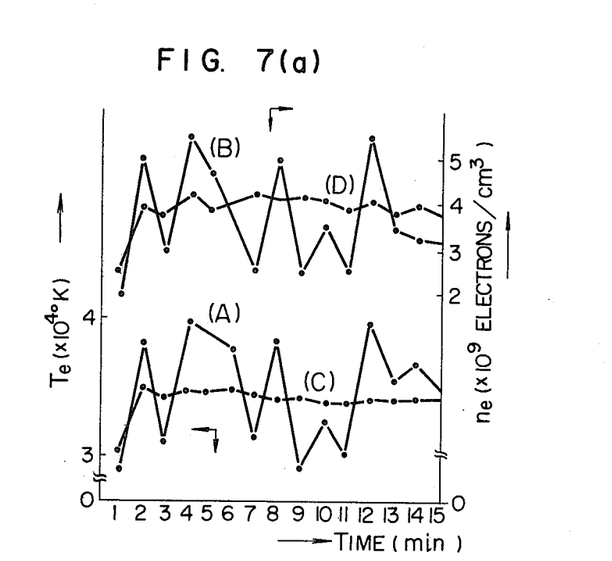
FIG. 7(a) is a graph indicating the changes of $T_e$ and $n_e$ with the lapse of time under the fixed preparation conditions and the changes of $T_e$ and $n_e$ with the lapse of time when the reaction is effected while controlling the reaction conditions by means of a probe.
Figure 7B:
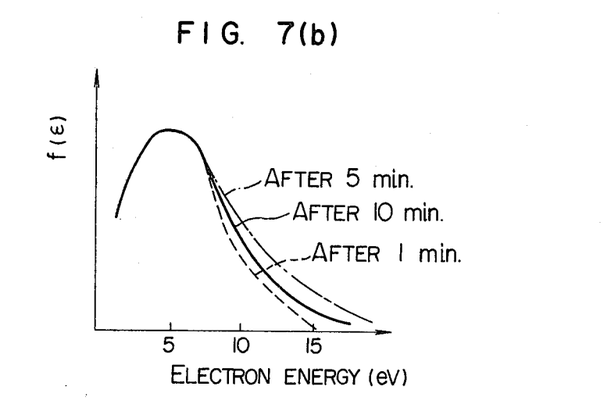
FIG. 7(b) is a graph indicating the change of f(ε) after the start of plasma reaction under the fixed input power, pressure and gas flow rate.

Using an electrode containing plasma reactor equipped with three probes according to the circuit as shown in FIG. 3, a plasma polymerization was carried out in the presence of argon, using styrene as a starting material. The probes used had the cylindrical structure shown in FIG. 1 in which the radius was 0.5 mm and the length was 10 mm and were made of nickel. The probes were heated to about 1300° K. by a heater inserted thereinto. Thus, a plasma-polymerized polystyrene was deposited in a thickness of about $0.2\mu$ on a commercial porous membrane (Millipore (registered trademark) membrane type VS). In order to evaluate the strength of this composite membrane, its pressure resistibility was measured by attaching the membrane to a pressure-resistant vessel and applying a static water pressure thereto using water as a medium. FIG. 6(a) shows the pressure resistibilities of polymer membranes obtained in ten runs of experiment wherein the designed conditions of experiment were that the input power in the plasma reactor was 40 watts, the pressure was 1 Torr, the styrene flow rate was 200 cc (STP)/min. and the argon flow rate was 200 cc (STP)/min., and the reaction conditions were controlled by measuring the individual factors with only an electric power meter, a Pirani vacuum gauge and a tapered tube type flow meter. The poor reproducibility of pressure resistibility of the polymer membrane is understandable from the data of the figure. Graphs A and B of FIG. 7(a) shows the changes of $T_e$ and $n_e$ with the lapse of time in Run No. 10 in FIG. 6(a), while FIG. 7(b) shows the change of $f(\epsilon)$ in the same run. All these data demonstrate that $T_e$, $n_e$ and $f(\epsilon)$ greatly change with the lapse of time if the input power, pressure and gas flow rate are merely initially set so as to agree with the predetermined standard values. This means that $T_e$, $n_e$ and $f(\epsilon)$ greatly vary with even slight changes of electric power, pressure and gas flow rate undetectable with the power meter, manometer or flow meter and with the changes occurring on the surface of the reactor wall. FIG. 6(b) shows the pressure resistibilities of the membranes obtained in ten runs of experiments, wherein the ten runs were carried out under the same operating conditions and, in each run, the whole process of polymerization was controlled over a period of 20 minutes by measuring $T_e$, $n_e$ and $f(\epsilon)$ at intervals of one minute and regulating the electric power, pressure and gas flow rate in the plasma reactor so that $T_e$, $n_e$ and $f(\epsilon)$ coincide with the predetermined standard values. As compared with the data of FIG. 6(a), the data of FIG. 6(b) exhibit a much better reproducibility of pressure resistibility. Graphs C and D in FIG. 7(a) show the changes of $T_e$ and $n_e$ in this experiment as functions of time. It is understandable that the changes of $T_e$ and $n_e$ with the lapse of time are negligibly small in graphs C and D as compared with graphs A and B. Furthermore, $f(\epsilon)$ does not change at all in the experiments of graphs C and D. These results demonstrate that reaction can be controlled only by measuring $T_e$, $n_e$ and $f(\epsilon)$ and regulating them.

EXAMPLE 2

It has been pointed out by many workers that a plasma reaction loses its reproducibility when the discharge system or the dimension and shape of reactor are altered. The inventors found that a reaction product which always has the same structure and performance can be obtained by measuring the plasma constants by use of the probe of this invention and adjusting the conditions of plasma reaction system so that the $T_e$, $n_e$ and $f(\epsilon)$ of the system always coincide with the optimum values, regardless of the style of reactor. Thus, a commercial porous membrane (Millipore membrane, type VS) was placed on the lower electrode 10 of the electrode-containing reactor used in Example 1, and a plasma-polymerized membrane of benzene was produced at a benzene flow rate of 250 cc (STP)/min. and an argon flow rate of 150 cc (STP)/min., under a pressure of 1 Torr at an electric input power of 50 watts. During the plasma polymerization, the above-mentioned operating factors were always finely controlled so that $T_e$, $n_e$ and $f(\epsilon)$ were kept unchanged. A static water pressure was applied to the plasma-polymerized membrane using water as a medium. The membrane showed a pressure resistibility of 100 kg/cm$^2$ or more. The probe surface temperature was the same as in Example 1.

EXAMPLE 3

Figure 9:
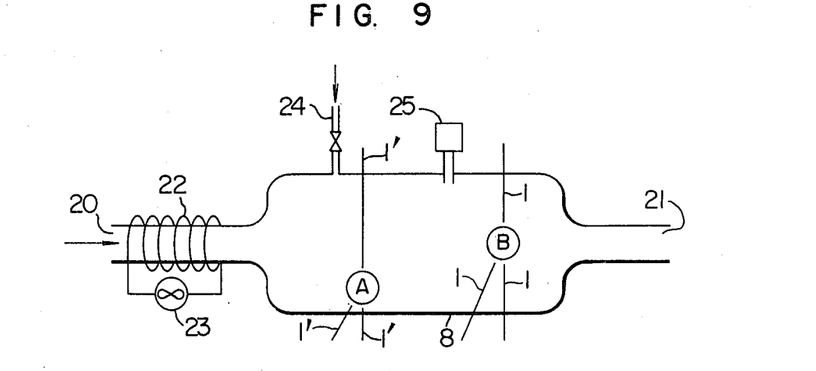
FIG. 9 is a conceptional diagram of an electrodeless plasma reactor.

FIG. 9 shows a conceptional diagram of an electrodeless plasma reactor, wherein 1 and 1' are probes, 8 is a reactor, 20 is a carrier gas inlet, 21 is an outlet, 22 is a plasma-generating coil, 23 is a power supply therefor, 24 is a monomer inlet and 25 is a manometer. In this reactor, a gas such as argon is introduced into the reactor through the carrier gas inlet 20 and brought into the state of plasma by supplying an electric power from the radio frequency power supply 23 to the coil 22, and a monomer is then fed from the inlet 24 to the reactor and is allowed to react in the reactor 8.

Using this reactor, a plasma-polymerized membrane was produced at the position B at the same power input, pressure and gas flow rate as in Example 2 without controlling the plasma constants, and its pressure resistibility was measured to find that the membrane had a pressure resistibility as small as 5 kg/cm² or less.

The same reaction was carried out in the reactor of FIG. 9 while measuring $T_e$, $n_e$ and $f(\epsilon)$ at the position B by use of the probe 1 and regulating the pressure, gas flow rate and input power by operating the exhaust gas regulating valve, gas flow rate regulating valve and electric power regulator so as to always give the same values of $T_e$ and $n_e$ as in Example 2. The probes used were the same as in Example 1, and the probe surface temperature was the same as in Example 1. The membrane thus obtained was subjected to measurement of pressure resistibility to find that it was 100 kg/cm² or more. By this procedure, membranes of constant performance can be obtained with a satisfactory reproducibility.

EXAMPLE 4

Although in a plasma reaction the yield, structure and performance of product are different from place to place even in the same reactor, the method of this invention enables to produce, at any place in the reactor, a product having the desired structure and performance in a constant yield.

In the quarz glass-made reactor of FIG. 9, a porous membrane (Millipore membrane, type VS) was placed in the A position, and a plasma-polymerized benzene membrane was formed thereon under the following initial conditions: benzene flow rate, 200 cc (STP)/min.; argon flow rate, 200 cc (STP)/min.; pressure, 1 Torr; and input power, 50 watts; while measuring the $T_e$ and $n_e$ at the A position by use of Ir-made probes 1 and 1' heated to 1,500° K., thereby controlling the reaction. The membrane thus obtained had a pressure resistibility of 100 kg/cm² or more.

Next, a Millipore membrane was placed at the B position and a membrane was produced under the same input power, pressure and gas flow rate as above. The pressure resistibility of the membrane thus obtained was distributed in the range of 20 to 100 kg/cm² and the membrane exhibited no stable performance. Measurement of $T_e$ and $n_e$ at the positions A and B by means of the probe revealed that $T_e(A) = 3.5 \times 10^4$ °K., $T_e(B) = 1.8 \times 10^4$ °K., $n_e(A) = 8.1 \times 10^{10}/\text{cm}^3$ and $n_e(B) = 2.1 \times 10^9/\text{cm}^3$, demonstrating a great difference between A and B. Next, the reaction was carried out while regulating the input power, pressure and gas flow rate at the B position by operating the electric power regulator, exhaust has regulating valve and gas flow rate regulating valve so that $T_e(B)$ and $n_e(B)$ became equal to the $T_e$ and $n_e$ valves previously obtained at the A position. As a result, the membrane obtained showed a pressure resistibility of 100 kg/cm² or more constantly. Therefore, the production of a membrane having the desired performance was made possible in any position in the reactor. The probes used had a shape of a square of 5 mm in each side and a thickness of 50 μm. A condensation heating type infrared heater (wave length: $10^5$ Å–$2 \times 10^3$ Å) of 100 V and 650 W was placed 5 cm distant from the reactor wall, and the probe surface was kept at 1500° K.

EXAMPLE 5

It is possible to modify the physical properties of a solid surface by exposing the solid surface to a plasma of a compound having a certain active group. For example, a solid surface can be modified an aniline plasma to have NH₂ groups thereby allowing the surface to have an affinity to organic compounds having amino groups. Also, a solid surface can be modified by an alcohol plasma to have OH groups, thereby making the surface hydrophilic.

Figure 8A:
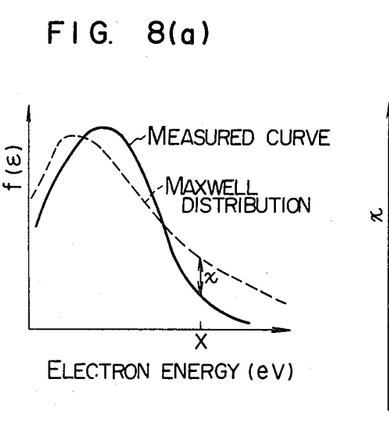
FIG. 8(a) is a graph indicating the measured values of f(ε) and the Maxwell distribution function which has been calculated on an assumption of having the same electron density and energy density, wherein X means the characteristic energy necessary for forming a free radical or an ion and x means the difference of the value of Maxwell distribution from the measured value of f(ε) at the energy X.
Figure 8B:
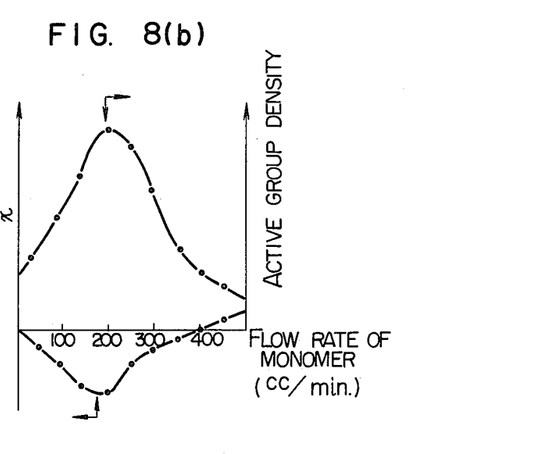
FIG. 8(b) is a graph indicating the variation of x with a change of monomer flow rate and the active group density present on modified solid surface.

For allowing the solid surface to have specific active groups with a high efficiency, it is quite effective to monitor the reaction conditions with reference to $f(\epsilon)$. In FIG. 8(a), there are shown two curves, one of which indicates the measured values of $f(\epsilon)$ in the course of argon-allylamine plasma polymerization and the other indicates a Maxwell distribution function calculated on an assumption that the plasma has the same electron density and energy density as in the measured values. X represents the characteristic energy necessary for forming an NH₂ radical from allylamine, in a plasma with a high efficiency, and x represents a difference of the value of Maxwell distribution from the measured value at the energy X. FIG 8(b) indicates the changes of the x value and the NH₂ radical density on the modified solid surface measured by electron spin resonance with a change of the flow rate of the compound. It is understandable that the minimum value of x roughly coincides with the maximum value of the NH₂ radical density, so that the NH₂ radical density can be controlled effectively by monitoring x.

In this Example, the plasma reactor of FIG. 9 was used, the probes used were the same as in Example 1, and the probe surface temperature was the same as in Example 1. The reaction conditions were input power of 40 Watts, an argon flow rate of 150 cc (STP)/min., an allylamine flow rate of 500 cc (STP)/min., and a pressure of 0.5 Torr. The experiment was carried out in the A position in the reactor.

EXAMPLE 6

This Example relates to a practice of ashing by means of plasma in the apparatus shown in FIG. 2. While closing the monomer inlet 13, O₂ was introduced through the carrier gas inlet 14 at the desired flow rate into the apparatus, and a radio frequency electric power of 13.56 MHz was applied to the electrodes 9 and 10. The sample 11 had been prepared by blending 30% by weight of S and 3% by weight of ZnO with a styrene-butadiene rubber, valcanizing the mixture at 170° C. for 20 minutes and cutting off 1 to 2 g of a piece from the vulcanized rubber. It had been placed on the electrode 10 as the sample 11. After ashing, Zn was quantitatively analyzed by titration with EDTA. The results obtained were as shown in the Table. In Run No. (1) where a high input power was applied, the velocity of ashing was high but its recovery was poor. In Run No. (2) where ashing was carried out with a low input power, the recovery was good but the velocity of ashing was quite low. In Run No. (3), the input power and O₂ flow rate were always regulated in the progress of ashing so that the measured values of $T_e$ and $n_e$ coincided with the predetermined optimum values of $T_e$ and $n_e$. In this run, a high ashing rate was obtained even when the recovery reached the same as in Run No. (2).

The probes used were made of iron, had the cylindrical structure of FIG. 1 of 0.5 mm in radius and 10 mm in length, and was heated to about 1,000° K. by the heater inserted thereinto.

Thus, the method of this invention is effective for enhancing the efficiency of low temperature ashing process.

TABLE

| Recovery of Zn by low temperature ashing of vulcanized rubber | | | |
|---|---|---|---|
| Run No. | (1) | (2) | (3) |
| Input power (watt) | 150 | 50 | *3 |
| $O_2$ flow rate (cc(STP)/min.) | 50 | 20 | *3 |
| $T_e$ ($\times 10^{4\circ}$ K.) | —2 | —2 | 3.1 |
| $n_e$ ($\times 10^9$ electrons/cm$^3$) | —2 | —2 | 2.5 |
| Ashing velocity ($\times 10^{-4}$ g/cm$^3$ . hr) | 4.9 | 0.3 | 1.6 |
| Recovery of Zn (%)[1] | 68 | 92 | 94 |

Note:
[1]Based on the weight charged.
[2]$T_e$ and $n_e$ were not measured.
[3]Input power and gas flow rate were always regulated so that $T_e$ and $n_e$ coincide with the predetermined values.

What is claimed is:

1. A method for conducting a plasma chemical reaction involving at least one gaseous reactant, comprising:
generating a plasma of said at least one gaseous reactant under a given set of gas pressure, input power, and gas flow rate plasma conditions;
continuously monitoring at least one plasma constant with at least one probe formed from a metal of small thermionic electron emission characteristics, said probe being heated indirectly to a predetermined temperature by infrared rays or an electric heating means; and
controlling said plasma conditions so that the measured values of the plasma constants always coincide with the values of plasma constants previously obtained by said probe necessary for effecting the intended chemical reaction.

2. The method of claim 1, wherein said plasma constants are the electron temperature ($T_e$), the electron density ($n_e$) and the electron energy distribution function ($f(\epsilon)$).

3. The method according to claim 1, wherein the plasma reaction is a plasma polymerization.

4. The method according to claim 1, wherein the plasma reaction is an ashing reaction.

5. The method according to claim 1, wherein the plasma reaction is a surface modification reaction.

6. The method according to claim 1, wherein said electric heating means for the probe is an inserted heater which heats said probe to a temperature at which the deposition of atoms, molecules or other active species onto the surface of said probe which can disturb the measurement of plasma conditions is prevented.

7. The method according to claim 1, wherein the source of said infrared rays is a light source which can emit electromagnetic waves at least some of which are infrared rays having a wave length shorter than $10^5$ Å which heats said probe to a temperature at which the deposition of atoms, molecules or other active species onto the surface of said probe which can disturb the measurement of plasma constants is prevented.

8. The method according to claim 1, 6 or 7, wherein said probe is heated to a temperature of 1,000° K. to 1,800° K.

9. The method according to claim 1, 6 or 7, wherein said probe is made of a metal having a thermionic electron emission of not more than $5 \times 10^{-6}$ A/cm$^2$ as calculated by the equation of Richardson.

10. The method according to claim 9, wherein said probe is made of Ni, Fe, Cr, W, Re, Rh, Ir, Pt or an alloy consisting of such metals.

11. The method according to claim 1, wherein said probe is made of Ir.

12. The method according to claim 11, wherein the temperature of said probe is at least 1,500° K.

13. The method according to claim 6, wherein said heater is covered with aluminum oxide, ruthenium oxide or high melting glass.

14. The method according to claim 1, wherein 2 or 3 probes are used.

* * * * *